United States Patent
Morinaga et al.

(10) Patent No.: US 6,810,573 B2
(45) Date of Patent: Nov. 2, 2004

(54) METHOD FOR MANUFACTURING FUEL INLET

(75) Inventors: Mikio Morinaga, Mie (JP); Hiroshi Kashima, Mie (JP); Takashi Nakamura, Mie (JP); Minoru Tada, Mie (JP); Shinji Hirakawa, Mie (JP)

(73) Assignee: Bestex Kyoei Co., Ltd., Mie (JP)

( * ) Notice: Subject to any disclaimer, the term of this patent is extended or adjusted under 35 U.S.C. 154(b) by 0 days.

(21) Appl. No.: 10/408,419

(22) Filed: Apr. 7, 2003

(65) Prior Publication Data
US 2004/0148755 A1 Aug. 5, 2004

(30) Foreign Application Priority Data
Jan. 30, 2003 (JP) ........................................ 2003-021250

(51) Int. Cl.⁷ ................................................ B23P 25/00
(52) U.S. Cl. ..................... 29/458; 29/889.5; 29/890.09; 29/890.14; 29/527.2; 137/588; 137/587
(58) Field of Search ........................... 29/888.02, 889.5, 29/890.09, 890.14, 460, 511, 515, 516, 522.1, 527.2, 527.4, 33 D, 458, 890.129, 527.6; 137/588, 587; 123/516; 220/86.2

(56) References Cited

U.S. PATENT DOCUMENTS

| | | | | |
|---|---|---|---|---|
| 2,837,810 A | * | 6/1958 | Ekholm | ................. 29/890.149 |
| 4,729,502 A | * | 3/1988 | Fukukawa et al. | ............ 228/13 |
| 5,644,829 A | * | 7/1997 | Mason et al. | ............... 29/421.1 |
| 6,260,401 B1 | * | 7/2001 | Tada | ........................ 72/370.06 |
| 6,390,124 B1 | | 5/2002 | Kido et al. | |
| 6,453,714 B2 | * | 9/2002 | Kido et al. | .................... 72/297 |
| 6,615,489 B2 | * | 9/2003 | Yoshida et al. | .......... 29/890.14 |
| 2003/0097894 A1 | * | 5/2003 | Ozeki | .......................... 74/422 |

FOREIGN PATENT DOCUMENTS

| | | |
|---|---|---|
| JP | 11-239835 | 9/1999 |
| JP | 2001-276942 | 10/2001 |
| JP | 2002-242779 | 8/2002 |

* cited by examiner

Primary Examiner—David P. Bryant
Assistant Examiner—Stephen Kenny
(74) Attorney, Agent, or Firm—Carrier, Blackman & Associates, P.C.; Joseph P. Carrier; William D. Blackman

(57) ABSTRACT

In manufacturing a fuel inlet, bulge forming and bend processing are conducted to a stainless pipe which will serve as an inlet pipe. Next, one end of the stainless pipe is eccentrically expanded, and the hardened portion is removed. After the pipe expanding step is finished, boring processing is conducted so that a breather pipe can be inserted into the inlet pipe, a guide is spot-welded to the inside of the eccentrically expanded portion, and a screw structure is formed. The inlet pipe and the breather pipe are degreased and cleaned as a pretreatment for brazing, and brazing is conducted by using BAg-4 (Low-temperature brazing material) at a temperature of 750–850° C. Removing of the flux and cleaning are conducted as a post-treatment for brazing, and finally coating is conducted.

14 Claims, 3 Drawing Sheets

METHOD FOR MANUFACTURING FUEL INLET

BACKGROUND OF THE INVENTION

1. Field of the Invention

The present invention relates to a method for manufacturing a fuel inlet (fuel feed pipe) for feeding fuel such as gas to a fuel tank of a motor vehicle or the like.

2. Description of the Prior Art

Conventionally, as an inlet pipe which constitutes a fuel inlet, an iron pipe having plating applied thereto and further having coating applied to the plating has been used. Also, with respect to the shape of the inlet pipe, one end of the pipe is eccentrically expanded, and a screw structure is formed in the end so that a cap can be attached thereto. Further a breather pipe is connected to an area of the inlet pipe which is lower than the area where the screw structure is formed, so as to discharge air from a tank.

As a method for eccentrically expanding a pipe member, there has been known a method (D1) in which a pipe member is set in a clamping die, a cored bar is inserted into the pipe member so as to coaxially expand the pipe member, and thereafter the pipe member is eccentrically expanded by using another die and another cored bar. Also, there has been known another method (D2) in which a pipe member is eccentrically expanded without a coaxial expansion process.

A fuel inlet is attached to an area which is susceptible to chipping damage due to pebbles or the like bouncing off a moving tire. Consequently, a coating film or a plating film becomes scratched, and sometimes an iron body is exposed, which causes a problem in resistance especially in a place strongly affected by salt. Thus, there has been proposed another method (D3) in which a stainless pipe is used instead of an iron pipe, a breather pipe is welded to the stainless pipe by projection welding, and thereafter cationic electrodeposition coating is applied to the surface.

D1: Japanese Patent Application Publication 2001-276942

D2: Japanese Patent Application Publication Hei 11-239835

D3: Japanese Patent Application Publication 2002-242779

By using a stainless pipe instead of an iron pipe, it is possible to improve the resistance. However, another problem is caused.

Specifically, in the eccentric expansion process, almost no warpage occurs in the case of an iron pipe, while warpage is greater in the case of a stainless pipe because a stainless pipe is obtained by welding a stainless sheet in a state of being curled to a tube shape and the expansion ratio is different between the welding area and the remaining area.

Also, in the case of a stainless pipe, at the end of the expanded portion where the decrease ratio of the sheet thickness is greatest, the work hardening ratio becomes great. Consequently, processing in a subsequent process becomes difficult.

In addition, since projection welding causes damage to the passive layer of the stainless surface, rust occurs in the area where ring projection welding of the breather pipe is conducted as described in D3.

SUMMARY OF THE INVENTION

To solve the above-mentioned problems, according to a first aspect of the present invention, there is provided a method for manufacturing a fuel inlet comprising the steps of eccentrically expanding one end of a stainless pipe so as to prepare an inlet pipe, welding a breather pipe to the inlet pipe, and thereafter applying coating, wherein, in the eccentrically expanding step, the stainless pipe is set into a clamping die having an inside diameter which is the same as the outside diameter of an end product, a cored bar for pipe expansion is inserted into the stainless pipe, and force is applied from the inside of the stainless pipe in the direction of the sheet thickness while the outside of the stainless pipe is restrained.

With this, it is possible to reduce warpage in the eccentrically expanding step.

Further, by applying a lubricant to the entire inner surface of the stainless pipe prior to the eccentrically expanding step, it is possible to prevent the oil from being in short supply on the sliding surface, and to omit application of a lubricant in a subsequent process.

Furthermore, by conducting a surface treatment for reducing friction resistance with respect to the inner surface of the clamping die and the outer surface of the cored bar for pipe expansion which are in contact with the stainless pipe, high accuracy of the eccentric expansion can be achieved.

Also, it is possible to provide a cooling means such as a flow path for cooling water in the cored bar. At the time of expanding the pipe, the friction between the cored bar and the pipe material generates heat, and thus the temperature of the cored bar is increased. As a result, the lubricant disappears and the sliding property is deteriorated. However, with the provision of the cooling means, the above-mentioned drawback can be solved.

To solve the above-mentioned problem, according to a second aspect of the present invention, there is provided a method for manufacturing a fuel inlet comprising the steps of eccentrically expanding one end of a stainless pipe so as to prepare an inlet pipe, welding a breather pipe to the inlet pipe, and thereafter applying coating, wherein, after the eccentrically expanding step, the outer end of the expanded portion is cut and removed.

At the beginning of the expanding step, the end of the pipe is expanded only in the direction of the outside diameter and there is no shrinkage generated in the direction of the axis. Thus, the decrease ratio of the sheet thickness is greater in the end of the pipe than in the remaining area at the beginning of the expanding step, and the end of the pipe suffers from a more excessive work hardening. If the hardened portion is left, processing in a subsequent process will become difficult. However, by removing the hardened portion (the outer end of the expanded portion), it is possible to facilitate processing in a subsequent process.

In order to remove the outer end of the expanded portion, it is preferable to cut from the inside diameter side toward the outside diameter side. By doing so, when curl forming is conducted to the inlet pipe, burr is allowed to be located in the inside of the curl, and thus, human hands are protected from directly contacting the burr.

Further, since the burr is also not located in the inside diameter side of the inlet pipe, even if a pipe expanding method having more processes is employed, there is no fear that the burr will be pinched, no damage will occur, and it is also possible to prevent the treated surface of the cored bar from peeling due to the pinching.

To solve the above-mentioned problem, according to a third aspect of the present invention, there is provided a method for manufacturing a fuel inlet comprising the steps of eccentrically expanding one end of a stainless pipe so as to prepare an inlet pipe, welding a breather pipe to the inlet pipe, and thereafter applying coating, wherein said welding step is conducted by using a brazing material mainly comprised of silver in a reducing atmosphere.

In the case of projection welding, even if cationic electrodeposition coating is applied to the welding area to the breather pipe, it is inevitable that rust will occur. However, by employing brazing, it becomes possible to prevent such a problem.

For the brazing welding, it is preferable to conduct degrease-cleaning by using alkali ionized water as a pretreatment, and to conduct flux-removal-cleaning by using acid ionized water as a subsequent treatment.

Also, for the coating step conducted after the welding step, it is preferable to employ cationic electrodeposition coating using a lead-free coating material or other coating (acrylic silicone coating) using a soluble coating material which contains no hexavalent chromium in order to help protect the environment.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
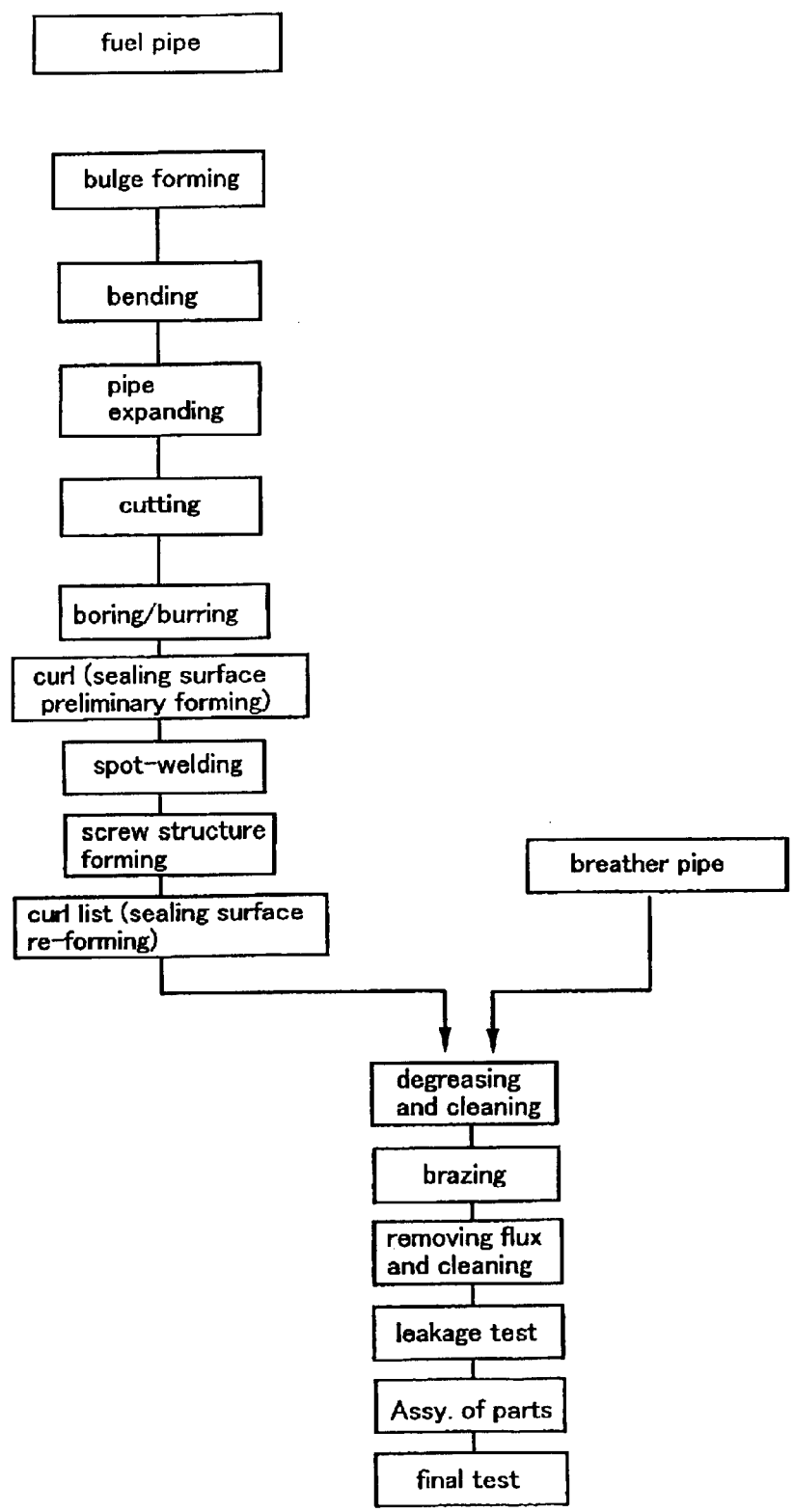
FIG. 1 is a diagram showing all processes for manufacturing a fuel inlet.
Figure 2:
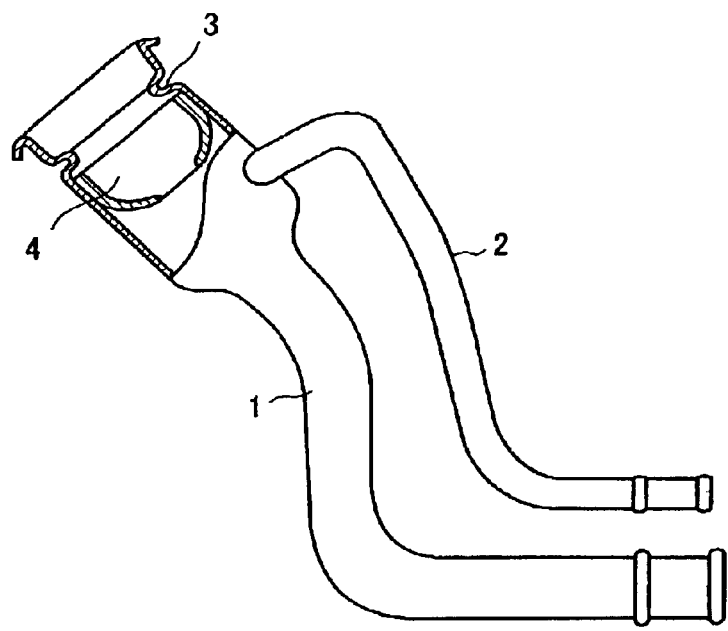
FIG. 2 is a cross-sectional view of a whole fuel inlet.
Figure 3:
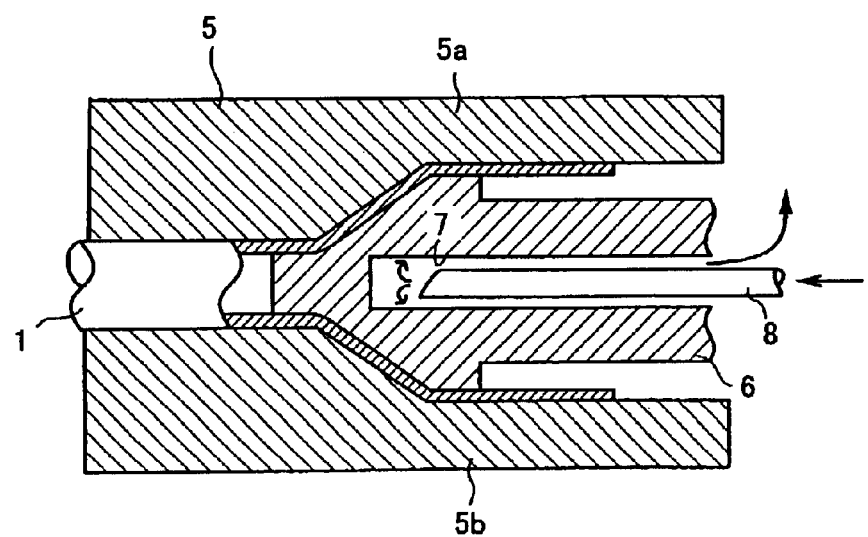
FIG. 3 is a view explaining the pipe expanding step according to the present invention.
Figure 4:
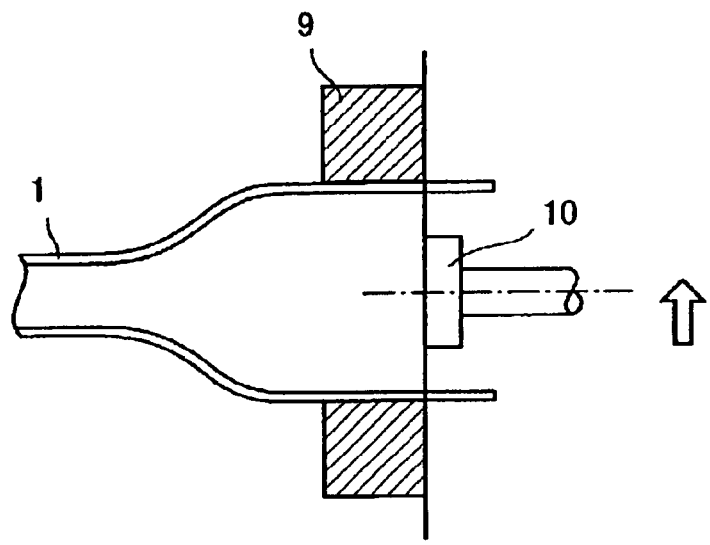
FIG. 4 is a view explaining the cutting step according to the present invention.
Figure 5:
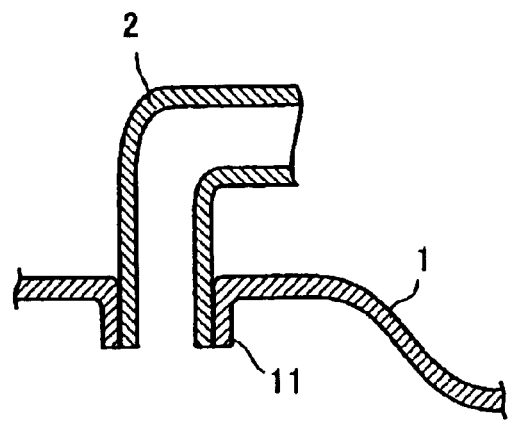
FIG. 5 is an enlarged view showing the structure of the joint area of a breather pipe.

Preferred embodiments of the present invention will now be described with reference to the accompanying drawings. FIG. 1 is a diagram showing all processes for manufacturing a fuel inlet; FIG. 2 is a cross-sectional view of a whole fuel inlet; FIG. 3 is a view explaining the pipe expanding step according to the present invention; FIG. 4 is a view explaining the cutting step according to the present invention; and FIG. 5 is an enlarged view showing the structure of the joint area of a breather pipe.

A fuel inlet is constructed of a stainless inlet pipe 1 and a stainless breather pipe 2 welded thereto as shown in FIG. 2. One end of the inlet pipe 1 is eccentrically expanded, a screw structure 3 is formed in the eccentrically expanded portion so that a cap can be attached thereto, and a guide 4 is spot-welded to the inside of the eccentrically expanded portion.

In order to manufacture the above-mentioned fuel inlet, as shown in FIG. 1, bulge forming and bend processing are conducted to a stainless pipe which will serve as an inlet pipe 1. At the time of this bend processing, a lubricant is applied to the whole inside of the stainless pipe.

Next, one end of the stainless pipe is eccentrically expanded. For the eccentric expansion, the stainless pipe is set into a clamping die 5 and a cored bar for pipe expansion 6 is inserted into the stainless pipe in this state.

The clamping die 5 is comprised of division dies 5a and 5b, and the inside diameter in a state where the division dies 5a and 5b are closed is equal to the outside diameter of the stainless pipe. By doing so, the outside diameter of the stainless pipe is restrained at the time of the eccentric expansion, and thus the eccentric expansion can be conducted with force being applied to the stainless pipe in a direction of the sheet thickness by the cored bar 6. Consequently, it is possible to prevent the stainless pipe from warping when the stainless pipe is released from the clamping die 5 after the forming.

The cored bar 6 has a flow path 7 for cooling water, as shown in FIG. 3, and cooling water is supplied from a tube 8. The cooling structure is not limited to this. By cooling the cored bar 6, it is possible to prevent the temperature of the cored bar 6 from being high due to heat caused by the friction between the cored bar and the stainless pipe. It is also possible to prevent the lubricant from being dispersed.

In the above-mentioned pipe expanding step, the end of the pipe is expanded only in the direction of the outside diameter at first. As the pipe expansion proceeds, shrinkage occurs in the direction of the axis because of occurrence of the axis direction force. The decrease ratio of the sheet thickness is great at the end of the pipe which is expanded only in the direction of the outside diameter at the beginning of the pipe expanding step, and this end of the pipe suffers from excessive work hardening. If the hardened portion is left, trouble will be caused in a subsequent process of further forming (such as curl forming).

Thus, as shown in FIG. 4, the expanded end of the pipe is retained by a clamping knife 9, and the hardened portion is removed from the inside diameter side toward the outside diameter side by using a rotating cutter knife 10. By cutting from the inside diameter side toward the outside diameter side, human hands are protected from being directly contact with the burr. Also, there is no fear that the burr will be pinched, no scratching will be caused even if a pipe expanding method having more processes is conducted, and the treated surface of the cored bar can be protected from peeling.

The above-mentioned eccentrically expanding step and the end-removing step may be conducted only once or a plurality of times. In a case where these steps are conducted a plurality of times with the clamping die 5 and the cored bar for pipe expansion 6 being exchanged, it is required that no warpage occurs in the stainless pipe. Accordingly, it becomes important to conduct the eccentrically expanding step with force being applied.

After the above-mentioned steps are finished, boring processing is conducted so that the breather pipe 2 can be inserted into the inlet pipe 1 (stainless pipe). In the bore formed in the inlet pipe 1, a burring portion 11 is allowed to be located inside the pipe as shown in FIG. 5. If the burring portion 11 were directed toward the outside, the edge (burring portion) would be located in the joint area, and the edge might be extremely oxidized due to heat at the time of jointing. Also, if the edge were located in the outside, the thickness of coating would be non-uniform, and the adhesion thereof would be deteriorated.

Next, curl forming (sealing surface preliminary forming) is conducted to the end of the eccentrically expanded portion, and thereafter a guide 4 is spot-welded to the inside of the eccentrically expanded portion. Further, a screw structure 3 is formed in the eccentrically expanded portion, and curl list (sealing surface re-forming) is conducted. It should be noted that the screw structure 3 is formed by employing a cam press forming apparatus which the present applicant has proposed earlier.

After the curl list (sealing surface re-forming) is finished, the inlet pipe 1 and a breather pipe 2 which is prepared separately are degreased and cleaned as a pretreatment for brazing. Incomplete degreasing of the applied lubricant oil will cause baking of the oil film in the inside surface of the pipe due to heat generated in a drying process. Therefore, alkali ionized water (temperature: 70–90° C.; pH: 9.2–9.8) is used for degreasing.

In the degreasing and cleaning process, it is common to use an organic solvent for degreasing. However, taking wastewater and the environment into account, it is preferable to avoid the use of an organic solvent. In addition, it is more effective to employ oscillation immersion cleaning with ultrasonic waves being used.

Next, brazing is conducted. The brazing is conducted by using BAg-4 (Low-temperature brazing material), at a temperature of 750–850° C., and by using inert gas such as nitrogen gas or argon gas as back shield gas. By using inert gas as back shield gas, the brazing is conducted in a reducing atmosphere so that it is possible to prevent chromium oxide from being generated on a surface of the heated area As a means for brazing, for example, torch brazing or high-frequency brazing is suitable. In the case of torch brazing, inert gas is supplied from a nozzle cover so as to enclose frames. In the case of high-frequency brazing, a cover for shield gas is used for enclosing the brazed area. However, by devising the kind of a flux, it is possible to conduct brazing without using shield gas. As an example of such a flux, it is possible to list a flux whose composition ratio is boric acid: 35 mass % maximum; potassium borate: 30 mass % maximum; hydrofluoric acid: 35 mass % maximum; and water: the remaining volume.

Next, removing of the flux and cleaning are conducted as a post-treatment for brazing. Incomplete removal of the flux will cause deterioration of anti-rust properties of the brazed area. Also, taking the environment into account, it is preferable to use acid ionized water (temperature: 70–90° C.; pH: 2.8 or less) for the removing the flux and cleaning. Also, it is more effective to employ oscillation immersion cleaning with ultrasonic waves being used.

After the above-mentioned processes are finished, a leakage test and assembling of other necessary parts are conducted, and coating is conducted. A coating method can be optionally chosen including cationic electrodeposition coating. However, in the case of cationic electrodeposition coating, it is preferable to use a lead-free coating material. In addition, in the case of a soluble coating material, it is preferable to employ acrylic silicone coating in which no hexavalent chromium is used in order to help protect the environment.

Next, a final product test is conducted, and manufacturing of a fuel inlet is completed.

As mentioned in the above, according to the present invention, it is possible to effectively prevent warpage in the eccentric expansion process which may occur in a case where a stainless pipe is used instead of an iron pipe.

Also, it is possible to greatly improve the efficiency of processing by removing the end of the expanded portion which has been hardened.

In addition, even in the case of a stainless pipe, rust is inevitably generated in the welded area of the breather pipe. However, by conducting brazing with silver, it becomes possible to prevent such a problem.

Specifically, a complex anti-rust property evaluation test was conducted in which a cycle of spraying of brine, drying by heating, wetting, and drying at room temperature (one cycle: 24 hours) was conducted 180 times. As a result, it has been shown that extremely good durability can be obtained according to the present invention.

Although the present embodiments of the invention have been described in detail above, it will be understood by persons skilled in the art that variations and modifications may be made thereto without departing from the spirit or essence of the invention.

What is claimed is:

1. A method for manufacturing a fuel inlet comprising the steps of:

eccentrically expanding one end of a stainless pipe so as to prepare an inlet pipe;

welding a breather pipe to said inlet pipe; and thereafter applying coating, wherein, in said eccentrically expanding step, said stainless pipe is set into a clamping die having an inside diameter which is the same as the outside diameter of an end product, a cored bar for pipe expansion is inserted into said stainless pipe, and force is applied from the inside of said stainless pipe in a direction of sheet thickness while the outside of said stainless pipe is restrained; and wherein an interior of said cored bar is cooled during said expansion step.

2. The method of claim 1, wherein a lubricant is applied to the entire inner surface of said stainless pipe prior to said eccentrically expanding step.

3. The method of claim 1, wherein a surface treatment for reducing friction resistance is conducted to the inner surface of said clamping die and the outer surface of said cored bar for pipe expansion which are in contact with said stainless pipe.

4. The method of claim 1, wherein said applying coating step employs cationic electrodeposition coating using lead-free coating material or other coating using soluble coating material which contains no hexavalent chromium.

5. The method of claim 1, wherein, after said eccentrically expanding step, the outer end of the expanded portion is cut and removed.

6. The method of claim 5, wherein the outer end of the expanded portion is cut from the inside diameter side toward the outside diameter side of said stainless pipe.

7. The method of claim 1, wherein said welding is brazing welding using a brazing material mainly comprised of silver.

8. The method of claim 7, wherein degrease-cleaning by using alkali ionized water is conducted as a pretreatment to said brazing step, and flux-removal-cleaning by using acid ionized water is conduce as a subsequent treatment to said brazing step.

9. A method for manufacturing a file inlet comprising the steps of:

eccentrically expanding one end of a stainless pipe so as to prepare an inlet pipe;

welding a breath pipe to said inlet pipe; and thereafter applying coating, wherein, after said eccentrically expanding stop, the outer end of the expanded portion is cut from the inside diameter side toward the outside diameter side of said stainless pipe and removed.

10. The method of claim 9, wherein said applying coating step employs cationic electrodeposition coating using lead-free coating material or other coating using soluble coating material which contains no hexavalent chromium.

11. The method of claim 9, wherein said welding is brazing welding using a brazing material mainly comprised of silver.

12. A method for manufacturing a fuel inlet comprising the steps of:
   eccentrically expanding one end of a stainless pipe so as to prepare an inlet pipe;
   welding a breather pipe to said inlet pipe; and
   thereafter applying coating,
   wherein said welding is brazing welding using a brazing material mainly comprised of silver, and said welding is conducted in a reducing atmosphere.

13. The method of claim 12, wherein degrease-cleaning by using alkali ionized water is conducted as a pretreatment to said brazing step, and flux-removal-cleaning by using acid ionized water is conducted as a subsequent treatment to said brazing step.

14. The method of claim 12, wherein said applying coating step employs cationic electrodeposition coating using lead-free coating material or other coating using soluble coating material which contains no hexavalent chromium.

* * * * *

UNITED STATES PATENT AND TRADEMARK OFFICE
CERTIFICATE OF CORRECTION

PATENT NO.     : 6,810,573 B2
DATED          : November 2, 2004
INVENTOR(S)    : Morinaga et al.

It is certified that error appears in the above-identified patent and that said Letters Patent is hereby corrected as shown below:

Column 6,
Line 51, change "conduce" to -- conducted --.
Line 60, change "expanding stop" to -- expanding step --.

Signed and Sealed this

Seventeenth Day of May, 2005

JON W. DUDAS
*Director of the United States Patent and Trademark Office*